(12) United States Patent
Howes

(10) Patent No.: US 9,830,134 B2
(45) Date of Patent: Nov. 28, 2017

(54) GENERATING OBJECT CODE FROM INTERMEDIATE CODE THAT INCLUDES HIERARCHICAL SUB-ROUTINE INFORMATION

(71) Applicant: QUALCOMM Incorporated, San Diego, CA (US)

(72) Inventor: Lee Howes, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 14/958,572

(22) Filed: Dec. 3, 2015

(65) Prior Publication Data

US 2016/0364216 A1 Dec. 15, 2016

Related U.S. Application Data

(60) Provisional application No. 62/175,646, filed on Jun. 15, 2015.

(51) Int. Cl.
*G06F 9/45* (2006.01)
(52) U.S. Cl.
CPC ............... *G06F 8/41* (2013.01); *G06F 8/443* (2013.01); *G06F 8/447* (2013.01); *G06F 8/452* (2013.01); *G06F 8/456* (2013.01)
(58) Field of Classification Search
CPC .............................................. G06F 8/40–8/458
See application file for complete search history.

(56) References Cited

U.S. PATENT DOCUMENTS

| 5,175,856 A | * | 12/1992 | Van Dyke | G06F 8/41 |
| | | | | 711/E12.006 |
| 5,339,238 A | * | 8/1994 | Benson | G06F 8/76 |
| | | | | 703/26 |
| 5,450,575 A | * | 9/1995 | Sites | G06F 11/3604 |
| | | | | 714/38.1 |
| 5,524,242 A | * | 6/1996 | Aida | G06F 8/45 |
| | | | | 717/146 |

(Continued)

FOREIGN PATENT DOCUMENTS

JP  3606654 B2  1/2005

OTHER PUBLICATIONS

International Search Report and Written Opinion from International Application No. PCT/US2016/029375, dated Jul. 7, 2016, 14 pp.

(Continued)

*Primary Examiner* — Tuan Q. Dam
*Assistant Examiner* — Zheng Wei

(57) ABSTRACT

Examples are described for a device to receive intermediate code that was generated from compiling source code of an application. The intermediate code includes information generated from the compiling that identifies a hierarchical structure of lower level sub-routines in higher level sub-routines, and the lower level sub-routines are defined in the source code of the application to execute more frequently than the higher level sub-routines that identify the lower level sub-routines. The device is configured to compile the intermediate code to generate object code based on the information that identifies lower level sub-routines in higher level sub-routines, and store the object code.

18 Claims, 5 Drawing Sheets

(56) References Cited

U.S. PATENT DOCUMENTS

| | | | | |
|---|---|---|---|---|
| 5,613,117 | A * | 3/1997 | Davidson | G06F 8/433 717/144 |
| 5,659,753 | A * | 8/1997 | Murphy | G06F 8/433 717/143 |
| 5,815,719 | A * | 9/1998 | Goebel | G06F 8/4441 717/146 |
| 5,920,723 | A * | 7/1999 | Peyton, Jr. | G06F 8/433 717/146 |
| 5,923,882 | A * | 7/1999 | Ho | G06F 8/447 717/147 |
| 6,195,793 | B1 | 2/2001 | Schmidt | |
| 6,675,377 | B1 * | 1/2004 | Tanaka | G06F 8/443 712/E9.084 |
| 7,228,531 | B1 * | 6/2007 | Langhammer | G06F 17/5045 717/146 |
| 7,921,418 | B2 * | 4/2011 | Nair | G06F 8/443 717/136 |
| 8,607,209 | B2 | 12/2013 | Chheda et al. | |
| 9,262,139 | B2 * | 2/2016 | Howes | G06F 8/443 |
| 2004/0010783 | A1 | 1/2004 | Moritz et al. | |
| 2004/0015927 | A1 * | 1/2004 | Haber | G06F 8/443 717/155 |
| 2004/0221281 | A1 | 11/2004 | Suganuma | |
| 2005/0138610 | A1 * | 6/2005 | Terunuma | G06F 8/41 717/140 |
| 2006/0277529 | A1 * | 12/2006 | Michimoto | G06F 8/4452 717/136 |
| 2007/0061787 | A1 * | 3/2007 | Trowbridge | G06F 8/44 717/140 |
| 2008/0046870 | A1 * | 2/2008 | Nair | G06F 8/443 717/140 |
| 2009/0055630 | A1 * | 2/2009 | Isshiki | G06F 8/456 712/216 |
| 2009/0113387 | A1 * | 4/2009 | Ziegler | G06F 8/30 717/109 |
| 2009/0307672 | A1 * | 12/2009 | Yamashita | G06F 8/00 717/155 |
| 2010/0153934 | A1 * | 6/2010 | Lachner | G06F 8/45 717/146 |
| 2011/0067018 | A1 * | 3/2011 | Kawachiya | G06F 8/433 717/156 |
| 2011/0265067 | A1 * | 10/2011 | Schulte | G06F 8/456 717/148 |
| 2012/0079467 | A1 * | 3/2012 | Tojo | G06F 8/452 717/150 |
| 2012/0117552 | A1 * | 5/2012 | Krishnaiyer | G06F 8/4441 717/160 |
| 2013/0215117 | A1 | 8/2013 | Glaister et al. | |
| 2013/0318544 | A1 * | 11/2013 | Kuroda | G06F 9/54 719/320 |
| 2014/0109068 | A1 * | 4/2014 | Cabillic | G06F 8/41 717/146 |
| 2014/0196016 | A1 | 7/2014 | Howes et al. | |
| 2015/0143347 | A1 * | 5/2015 | Jones | G06F 8/30 717/140 |
| 2015/0347102 | A1 * | 12/2015 | Lattner | G06F 8/41 717/146 |
| 2016/0170724 | A1 * | 6/2016 | Mahaffey | G06F 8/315 717/151 |

OTHER PUBLICATIONS

Jääskeläinen, et al., "pocl: A Performance-Portable OpenCL Implementation", International Journal of Parallel Programming, Plenum Press, New York, US, vol. 43, No. 5, Aug. 19, 2014, pp. 752-785, XP035519405, ISSN: 3885-7458, DOI: 10.1007/S10766-014-0320-Y [retrieved on Aug. 19, 2014], 38 pp.

Mikushin, et al., "KernelGen—the Design and Implementation of a Next Generation Compiler Platform for Accelerating Numerical Models on GPUs", USI Technical Report Series in Informatics, USI-INF-TR-2013-2, Jul. 2013, XP055191803, Retrieved from the Internet: URL: http://inf.unisi.ch/file/pub/75/tech_report2013.pdf [retrieved on May 28, 2015], 14 pp.

"Parallel for hierarchical invoke," 3.5.3.3, Khronos OpenCL Working Group, May 8, 2015, pp. 124-125.

Response to Written Opinion from corresponding PCT Application Serial No. PCT/US2016/029375 dated Apr. 7, 2017 (21 pages).

Standard Written Opinion from corresponding PCT Application Serial No. PCT/US2016/029375 dated Jul. 11, 2017 (9 pages).

International Preliminary Report on Patentability from corresponding PCT Application Serial No. PCT/US2016/029375 dated Sep. 6, 2017 (24 pages).

* cited by examiner

GENERATING OBJECT CODE FROM INTERMEDIATE CODE THAT INCLUDES HIERARCHICAL SUB-ROUTINE INFORMATION

This application claims priority to U.S. Patent Application No. 62/175,646 filed Jun. 15, 2015 and entitled "HIERARCHICAL SUB-ROUTINE INFORMATION IN INTERMEDIATE CODE," the entire content of which is hereby incorporated by reference.

TECHNICAL FIELD

This disclosure relates to compilers, and more particularly, to compilers that generate portable intermediate code for execution on a processing unit.

BACKGROUND

A processor on a computing device executes object code that is generated from compiling code (i.e., instructions) written in a high-level programming language. To generate the object code, a compiler first translates the code written in the high-level programming language into intermediate code (i.e., code in an intermediate language). Another compiler on the same or some other system, or may be the same compiler, translates the code in the intermediate language into machine code that is then executed by the processor or some other processor in the system.

SUMMARY

This disclosure describes techniques for inclusion of function calls into intermediate code that identify hierarchical relationships between sub-routines in an application written in a high-level language (e.g., in source code of the application). For instance, a compiler compiling the application written in the high-level language may include the function calls into the intermediate code. The hierarchical relationship between sub-routines indicates that a first sub-routine is dependent upon completion of a second sub-routine, and that the second sub-routine executes more frequently than the first sub-routine. In this case, the first sub-routine is considered to be at a higher level than the second sub-routine.

Another compiler (or possibly the same compiler) further compiles the intermediate code into object code. For compiling the intermediate code into the object code, the compiler (e.g., this other compiler or the same compiler) utilizes the functions calls in the intermediate code to generate object code that exploits the processing capabilities of the processor that is to execute the object code. In this way, the intermediate code is more portable for executing on different processors because the intermediate code includes function calls that separate out the higher level sub-routines and the lower level sub-routines allowing the compiler to determine how to arrange the sub-routines for execution to best use the processing capabilities of the processor on which the object code will execute.

In one example, the disclosure describes a method of compiling, the method comprising receiving, with a processor, intermediate code that was generated from compiling source code of an application, wherein the intermediate code includes information generated from the compiling that identifies a hierarchical structure of lower level sub-routines in higher level sub-routines, and wherein the lower level sub-routines are defined in the source code of the application to execute more frequently than the higher level sub-routines that identify the lower level sub-routines, compiling, with the processor, the intermediate code to generate object code based on the information that identifies the lower level sub-routines in the higher level sub-routines, and storing the object code.

In one example, the disclosure describes a device for compiling, the device comprising a memory unit, and an integrated circuit comprising a processor, the processor configured to receive intermediate code that was generated from compiling source code of an application, wherein the intermediate code includes information generated from the compiling that identifies a hierarchical structure of lower level sub-routines in higher level sub-routines, and wherein the lower level sub-routines are defined in the source code of the application to execute more frequently than the higher level sub-routines that identify the lower level sub-routines, compile the intermediate code to generate object code based on the information that identifies the lower level sub-routines in the higher level sub-routines, and store the object code in the memory unit.

In one example, the disclosure describes a device for compiling, the device comprising means for receiving intermediate code that was generated from compiling source code of an application, wherein the intermediate code includes information generated from the compiling that identifies a hierarchical structure of lower level sub-routines in higher level sub-routines, and wherein the lower level sub-routines are defined in the source code of the application to execute more frequently than the higher level sub-routines that identify the lower level sub-routines, means for compiling the intermediate code to generate object code based on the information that identifies the lower level sub-routines in the higher level sub-routines, and means for storing the object code.

In one example, the disclosure describes a non-transitory computer-readable storage medium comprising instructions that when executed cause one or more processors to receive intermediate code that was generated from compiling source code of an application, wherein the intermediate code includes information generated from the compiling that identifies a hierarchical structure of lower level sub-routines in higher level sub-routines, and wherein the lower level sub-routines are defined in the source code of the application to execute more frequently than the higher level sub-routines that identify the lower level sub-routines, compile the intermediate code to generate object code based on the information that identifies the lower level sub-routines in the higher level sub-routines, and store the object code.

The details of one or more examples are set forth in the accompanying drawings and the description below. Other features, objects, and advantages will be apparent from the description and drawings, and from the claims.

DETAILED DESCRIPTION

Figure 1:
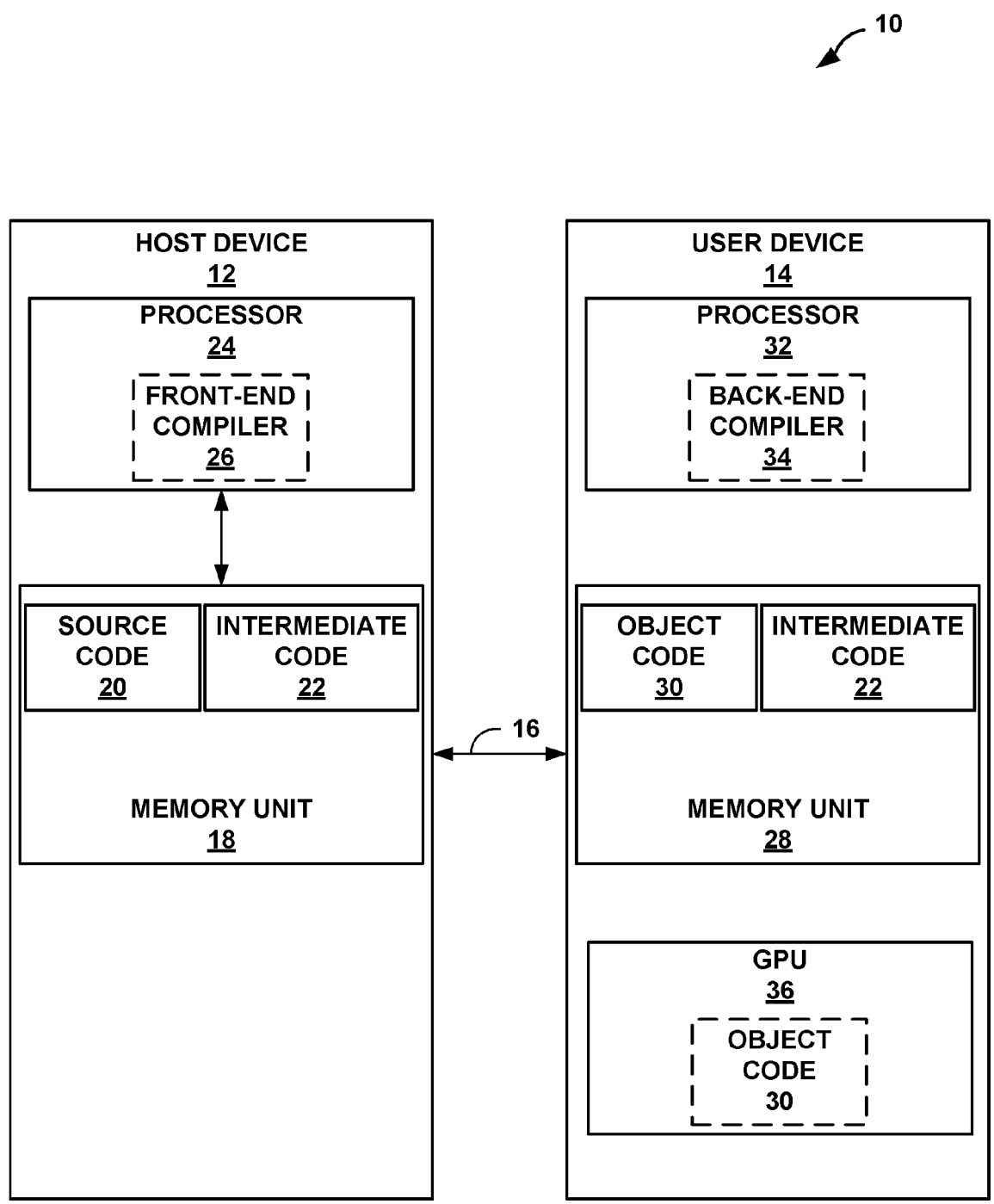
FIG. 1 is a block diagram illustrating an example system for implementing aspects of this disclosure.

A processor (e.g., a graphics processing unit (GPU) or a central processing unit (CPU)) executes instructions of a program that cause the processor to perform certain functions. An application developer develops the program using the syntax of a particular standard. For instance, the application developer may use standards defined by the application programming interface (API) of the OpenCL™ specification or the Heterogeneous System Architecture (HSA) specification as two non-limiting examples. For ease of illustration, the techniques described in the disclosure are described with respect to the OpenCL™ specification merely to assist with understanding. However, the techniques described in this disclosure are not limited to an application developed according to any particular standard.

The OpenCL™ specification allows the application developer to write the program in a higher-level programming language (e.g., write source code for the application) that instructs the processor to perform certain functions. The program can then be executed on a variety of different processor types such as GPUs, CPUs, Field Programmable Gate Arrays (FPGAs), digital signal processors (DSPs), and the like. A CPU is sometimes referred to as a host, and these other example hardware units are sometimes referred to more generically as devices. In this disclosure, the term device may be used to refer to a unit that includes the CPU, GPU, FPGA, and/or DSP or to refer to the CPU, GPU, FPGA, and/or DSP. Accordingly, the term "device" should not be considered limited to examples such as GPUs, FPGAs, and/or DSPs, and includes the CPU as well as the unit that houses these example components.

The term "program" refers to any set of instructions written in a higher-level programming language that instructs the processor to perform certain functions. For instance, the term "program" is used to include programs developed in accordance with the OpenCL™ specification, or programs developed using any other specification, as well as programs written in any higher-level programming language such as C++. Another example, of a higher-level programming language is SYCL™, which is a high level programming model built on top of OpenCL™.

For a processor to execute the instructions of the program, a compiler translates instructions of the program into code of an intermediate language (e.g., assembly language). The code in the intermediate language is also referred to as intermediate code. This intermediate code may be fairly portable for different processors. For example, when a user causes a device (e.g., a mobile device, laptop, desktop, etc.) to download a program for execution, the device may download the intermediate code in the intermediate language.

A compiler, on the device that downloaded the intermediate code, may further compile the intermediate code to generate the object code that is to be executed on the processor (e.g., CPU, GPU, FPGA, and/or DSP). The processor may then execute the object code.

The compiler that generates the intermediate language is referred to as a front-end compiler or high-level compiler, and the compiler that generates the object code is referred to as a back-end compiler or low-level compiler. The front-end compiler and the back-end compiler may execute on different devices. For example, the front-end compiler may execute on a device of the application developer (or a server that houses the intermediate code) to generate the intermediate code in the intermediate language, and the back-end compiler may execute on a device of the user to generate the object code. In some example, the back-end compiler may be an on-the-fly back-end compiler that generates the object code during the execution of the program, rather than pre-storing the object code.

It should be understood that the front-end compiler and the back-end compiler need not necessarily execute on different devices. For instance, in the above example, the user device downloaded the intermediate code. In some other examples, the user device may download the instructions of the program, rather than the intermediate code. In such examples, a compiler, executing on the user device, may generate the intermediate code via a front-end module of the compiler, and generate the object code via a back-end module of the compiler. In this disclosure, different compilers are described as generating the intermediate code and generating the object code (e.g., a front-end compiler and a back-end compiler executing on different devices), but the techniques should not be considered limited.

As described above, OpenCL™ defines a structure for developing a program that executes across platforms (e.g., on different types of processors). In some cases, developers created programs using OpenCL™ that included unnecessary operations not applicable to all processor types. For example, in single-program-multiple-data (SPMD) parallelism, a processor executes multiple instances of the same program, where each program may operate on different data. The OpenCL™ and HSA specifications are useful to map SPMD parallelism to single-instruction-multiple-data (SIMD) execution units. However, in such mapping, information about the parallel structures may be lost.

To address this, the OpenCL™ specification allows for "barrier" instructions. The barrier instruction causes instances of the program to pause executing so that all instances of the program can be synchronized (i.e., allows slower instances of the program to catch up). The synchronization allows instances of the program to communicate with another.

For instance, for OpenCL™ workgroups, to communicate between instances the developer may use barriers. These barriers act as communication operations between independent entities. However, in some cases, many of these entities may map to the same thread and would be better served by being treated that way. In other words, rather than having different parallel instances, it may be better for there to be serial execution. In some cases, a toolchain of OpenCL™ may not be able to infer whether the entities map to different threads or the same thread.

To address this, the SYCL™ high level programming model was built on top of OpenCL™, and enabled a structured form of parallelism. With SYCL™, the code maintains more information such that its performance is more portable (i.e., usable across multiple different types of devices). One way that SYCL™ achieves such a result is by allowing for a hierarchical structure. In the hierarchical structure, the program includes multiple sub-routines (also referred to as program blocks or modules). One of the sub-routines may be dependent upon another sub-routine, and the frequency of execution of the sub-routines may be different (e.g., the dependent sub-routine may execute N number of times for every one time that the other sub-routine executes). The dependent sub-routine may be considered as being at a lower level in the hierarchical structure, and the sub-routine on which it is dependent as a higher level in the hierarchical structure.

A basis example of such a hierarchical structure is a nested for-loop. In this example, for every one time that the higher level for-loop executes, the lower level for-loop executes N number of times.

In some earlier cases, barriers would be used to allow loops of different instances to catch up with one another. With SYCL™, instead of trying to achieve loop fission either side of a barrier, the hierarchical structure breaks that down explicitly as two loops.

However, the manner in which such hierarchical structured programs should be executed on different processor types may be different. For example, on a GPU that provides massive parallelism, it may be beneficial to have many instances of the program executing in parallel with slightly different inputs and fewer commands, but for a CPU that does not provide massive parallelism, it may be beneficial to have fewer instances of the program executing with more commands.

One issue that may arise is that the compiler that compiles the program to generate the intermediate code in the intermediate language (e.g., front-end compiler) may be unaware of the processor type on which the program will execute (e.g., CPU or GPU). Therefore, the front-end compiler selects one way in which to generate the intermediate code in the intermediate language, but this way may be well suited for some processor types and not well suited for other processor types.

For instance, one example of an intermediate language is SPIRV™, and a program written using SYCL™ is compiled to code in SPIRV™. In some cases, the program developed using hierarchical structure (e.g., program written using SYCL™) loses the hierarchical structure information when compiled to the intermediate language (e.g., SPIRV™). The high level compiler (e.g., front-end compiler) has to choose one mapping (e.g., constructing intermediate code that is specific to a processor type) instead of leaving that portable mapping up to the back-end compiler.

It may be beneficial to allow the back-end compiler to determine how the hierarchical structure should be further compiled because the back-end compiler may be configured with information indicating the type of processor on which the program will execute. In some techniques, the front-end compiler loses the hierarchical structure information in the intermediate code, meaning that the back-end compiler cannot compile the intermediate code to specialize the object code for the processor type on which it is to execute.

In accordance with the techniques described in this disclosure, the front-end compiler may be configured to add hierarchy of function types and dispatch instructions to the intermediate code in the intermediate language (IL) (e.g., in the IL SPIRV as an example). The back-end compiler may utilize this information of the hierarchical structure to compile the intermediate code and generate object code that exploits the processing capabilities of the processor on which the program is to execute.

For example, to identify the hierarchical structure, the front-end compiler may include functions within a sub-routine (e.g., program block) that identifies a lower level dependent sub-routine. The lower level sub-routine may execute more frequently than the sub-routine upon which it depends (e.g., the higher level sub-routine). In general, the front-end compiler may mark functions as representing some unit of execution in an execution graph. An execution graph may be a conceptual diagram identifying ways in which sub-routines of the program are related to one another. Examples of functions used to identify sub-routines include current SPMD work-items, entire subgroups, entire workgroups, and may even include the dispatch entry point for global operations.

In some examples, entry points are marked with this scale: Kernel, Workgroups, Subgroup, Work-item (as an example of highest hierarchical level to the lowest hierarchical level). These may be the default currently in all SPIR-V and HSAIL kernels.

For blocks of code (e.g., sub-routine) that map to a finer granularity (e.g., lower hierarchical level) of parallelism in SYCL™ are marked as the body of callable objects/lambda functions. This may be one example way in which the front-end compiler includes functions in higher level sub-routine to call a lower level sub-routine. In essence, with the marking as callable objects/lambda functions, the finer granularity of parallelism makes them separate functions that can be inlined. In this disclosure, inlined means functions for which information can be added in the program. The resulting intermediate code in the intermediate language (IL) version of this would outline (e.g., separate out) all such blocks into separate function so that function boundaries mark the granularity transition. Additional dispatch functions are there added to transition to a finer granularity: OpSGFunctionCall, OpWlFunctionCall, and so on.

In some examples, it may be possible for the front-end compiler to also add parallel loop constructs to launch a set of child subgroups (e.g., lower level sub-routine). This may be a more dynamic behavior, while some architectures have a fairly static hierarchy. In a static hierarchy the behavior would be that the move from workgroup granularity to subgroup granularity would enter the subgroup function for each subgroup in the workgroup. Similarly, the subgroup to work-item transition would invoke the work-item function for each work-item in the subgroup. This example is in effect a uniform to non-uniform state transition on a SIMD unit. Such a structure may also be embedded in the hardware ISA (instruction set architecture), if the ISA caries a notion of different states, or different execution units. A scalar unit might transition to the vector units through such a state change.

For instance, in an example where there are multiple lower level instances (e.g., lower level sub-routines), the front-end compiler may compile the lower level sub-routines together into SIMD instructions and issued together as a single thread. There may be multiple instances of the thread executing in parallel in a SIMD structure. The number of concurrent threads may not increase as the front-end compiler goes down the hierarchy in all cases, instead the lower levels may be mapped to data parallel parts of a single thread.

Accordingly, in some examples, a server device (e.g., one from which a user device downloads applications) includes a memory unit and a processor. The processor may be configured to execute a compiler (e.g., front-end compiler) to compile code of a program written in a high-level programming language. In this example, compiling the code includes adding information in an intermediate code in an intermediate language generated from the compiling that identifies lower level sub-routines in higher level sub-routines, and lower level sub-routines execute more frequently than the higher level sub-routine that identify the lower level sub-routines. The processor may output the intermediate code for storage in the memory unit. The memory unit may be internal to the processor or external to the processor.

Also, in this disclosure, a device (e.g., a user device) includes a memory unit configured to store an intermediate code in an intermediate language that was generated from compiling code of a program written in a high-level programming language. The intermediate code includes information generated from the compiling that identifies lower level sub-routines in higher level sub-routines, and lower level sub-routines execute more frequently than the higher level sub-routine that identify the lower level sub-routines. The device also includes a processor configured to receive the intermediate code, compile (e.g., with a back-end compiler) the intermediate code in the intermediate language to generate object code based on the information that identifies lower level sub-routines in higher level sub-routines, and execute the object code.

FIG. 1 is a block diagram illustrating an example system 10 for implementing aspects of this disclosure. As illustrated, system 10 includes host device 12 and user device 14. Host device 12 may comprise a wide range of devices, including application hosting servers, desktop computers, mobile computing devices, and notebook (e.g., laptop) computers, tablet computers. Examples of user device 14 include desktop computers, and wireless communication devices such as mobile computing devices, notebook computers, telephone handsets (so-called "smart" phones), and tablet computers. Additional examples of user device 14 include set-top boxes, televisions, cameras, display devices, digital media players, video gaming consoles, in-car computers, or the like. One or more of these examples of user device 14 may be combined together (e.g., a digital media player executing on a wireless communication device).

User device 14 may receive intermediate code 22 from host device 12 via a channel 16. Channel 16 may comprise one or more media or devices capable of moving data from host device 12 to user device 14. In one example, channel 16 may comprise one or more communication media that enable host device 12 to transmit data directly to user device 14 in real-time. In this example, host device 12 may modulate the encoded video data according to a communication standard, such as a wireless communication protocol, and may transmit the modulated video data to user device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from host device 12 to user device 14.

In another example, channel 16 may include a storage medium that stores intermediate code 22 generated by host device 12. In this example, user device 14 may access the storage medium via disk access or card access. The storage medium may include a variety of locally-accessed data storage media such as Blu-ray discs, DVDs, CD-ROMs, flash memory, or other suitable digital storage media for storing data.

In a further example, channel 16 may include a file server or another intermediate storage device that stores intermediate code 22 generated by host device 12. In this example, user device 14 may access intermediate code 22 stored at the file server or other intermediate storage device via streaming or download. The file server may be a type of server capable of storing data and transmitting the data to user device 14. Example file servers include web servers (e.g., for a website), file transfer protocol (FTP) servers, network attached storage (NAS) devices, and local disk drives.

As illustrated, host device 12 includes memory unit 18 and processor 24. Processor 24 may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. Memory unit 18 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, memory unit 18 may be on-chip with processor 24. In examples where memory unit 18 is off-chip of processor 24, examples of memory unit 18 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

A developer develops an application that is to execute and stores the application as source code 20 on memory unit 18. Examples of the applications include kernels in accordance with OpenCL™ or shader programs in accordance with OpenGL™, both of which execute on a graphics processing unit (GPU), such as GPU 36. For ease of description, source code 20 is described as executing on GPU 36. However, the techniques described in this disclosure are not so limited and source code 20 may be for an application that executes on a different processor type.

Memory unit 18 stores source code 20 and intermediate code 22. Processor 24 executes front-end compiler 26 that receives source code 20 and generates intermediate code 22 for storage in memory unit 18. In this example, the developer may develop source code 20 in a high level language such as SYCL™. The developer may develop source code 20 such that multiple instances of the application can execute in parallel.

One way to develop source code 20 is to include workgroups, subgroups, and work-items that are arranged hierarchically in source code 20. For example, a workgroup includes one or more subgroups and/or one or more work-items and a subgroup includes one or more work-items. In this example, the workgroup is at the highest level, the subgroup(s) are at the intermediate level, and the work-item(s) are the lowest level.

For ease of description, workgroups, subgroups, and work-items are referred to generally as sub-routines. In a hierarchical structure, a higher level sub-routine depends on the completion of execution of a lower level sub-routine, and a lower level sub-routine is defined in source code 20 as being executed more frequently than the higher level sub-routine. As an example, a developer may write source code 20 in which a subgroup defines that a work-item is to execute N number of times. As explained in more detail, the lower level sub-routine does not necessarily always have to execute more often the higher level sub-routine if there are sufficient execution paths to execute all instances of the work-item in parallel.

In the techniques described in this disclosure, processor 24 of host device 12 retrieves source code 20 from memory unit 18 and executes front-end compiler 26 to compile source code 20 to generate intermediate code 22 that processor 24 stores back in memory unit 18. Front-end compiler 26 is referred to as a "front-end" compiler because the output of front-end compiler 26 is intermediate code 22 and not object code that is executed. One example of intermediate code 22 is code in standardized portable intermediate representation (SPIR) assembly language.

A benefit of intermediate code 22 is that intermediate code 22 is portable. For example, a device, such as user device 14, may retrieve intermediate code 22 and compile intermediate code 22 to generate the object code (e.g., object code 30) locally. In this way, intermediate code 22 can be generic to various types of processors (hence portable), and the object code is generated locally from intermediate code 22 based on the processor type on which the object code is to execute.

As one example, processor 32 of user device 14 may cause user device 14 to retrieve intermediate code 22 via channel 16 and may store intermediate code 22 in memory unit 28. Examples of processor 32 and memory unit 28 are similar to those described above with respect to processor 24 and memory unit 18. However, processor 24 and memory unit 18 may be more "robust" (e.g., faster processors and more memory) as compared to processor 32 and memory unit 28 because processor 32 and memory unit 28 may be on a handheld device where power and space is a premium compared to processor 24 and memory unit 18, which may be on a desktop computer or a server or a computing unit on which power and space are not a premium. The techniques are not limited to processor 32 and memory unit 28 being less robust than processor 24 and memory unit 18, and such description is provided merely for purposes of illustration.

Processor 32 may retrieve intermediate code 22 and execute back-end compiler 34 to generate object code 30, which processor 32 stores back in memory unit 28. In some examples, processor 32 may generate object code 30 during the execution of the program that calls on the application represented by object code 30 to execute. For example, processor 32 may execute a program (e.g., a video game) and during execution of the video game, processor 32 may determine that an application (e.g., a vertex shader) is to execute. In this example, intermediate code 22 may be for the vertex shader, and processor 32 may execute back-end compiler 34 to generate object code 30 on-the-fly with the execution of the video game. The techniques should not be considered limited to on-the-fly compiling and compiling prior to execution is possible.

As illustrated in FIG. 1, user device 14 includes graphics processing unit (GPU) 36 and GPU 36 executes object code 30. However, as described in some examples, processor 32 or some other processing unit may execute object code 30. Examples of GPU 36 include, but are not limited to, a DSP, a general purpose microprocessor, an ASIC, an FPGA, or other equivalent integrated or discrete logic circuitry. In some examples GPU 36 may be specialized hardware that is specifically designed for graphics processing. For example, graphics processing may require fast parallel processing, and GPU 36 may be specifically designed for such fast parallel processing. It may be possible for GPU 36 to perform tasks in addition to graphics processing, such as general processing task. Accordingly, GPU 36 may be considered as a general processing GPU (GPGPU). The techniques described in this disclosure may apply to examples where GPU 36 performs only graphics related tasks or examples where GPU 36 is a GPGPU.

As described above, object code 30 may execute on GPU 36, but may alternatively execute on processor 32. However, the execution capabilities of processor 32 and GPU 36 may be different, meaning that object code 30 may execute differently on processor 32 and GPU 36 resulting in different amount of time it takes to complete execution.

As an illustration, GPU 36 may be configured to provide SIMD processing for allowing multiple instances of the same program to execute (e.g., SPMD parallelism). In SPMD processing, multiple instances of the same program are executing in parallel (e.g., at the same time), and in SIMD processing, multiple instances of the same thread are executing in parallel (e.g., at the same time). The data for each of the instances of the program or instruction (e.g., for SPMD or SIMD) may be different, but the instructions are the same.

GPU 36 may be specialized in the sense that GPU 36 provides multiple SIMD lanes (e.g., 32 or 64) so that multiple instances of the same instruction (e.g., thread) can execute on parallel. Processor 32, however, may not be designed to provide parallel processing, and may be better suited for sequential processing. For instance, processor 32 may only be able to execute one instance of an instruction at a time, rather than multiple instances in parallel. Because of such differences in processing capabilities of processor 32 and GPU 36, object code 30 may execute differently.

As a basic example to assist with understanding, assume that a for-loop loops through 32 times (e.g., for (int i=0; i<32; i++)), and for each loop, GPU 36 executes a particular sub-routine. There may be various ways to implement this for-loop. A first way is to keep the for-loop and have the for-loop loop sequentially execute the sub-routine 32 times. A second way is to "flatten" the for-loop, and have 32 parallel executions of the sub-routine. Other ways exist as well (e.g., execute the sub-routine over 16 SIMD lanes with a for-loop that counts to 2). In the above examples, the first way to execute this for-loop would be well suited for processor 32, and poorly suited for GPU 36. The second way to execute this for-loop would be well suited for GPU 36, and poorly suited for processor 32. Accordingly, the manner in which back-end compiler 34 generates object code that is part of object code 30 for this for-loop effects how efficient processor 32 or GPU 36 is at executing object code 30.

In accordance with the techniques described in this disclosure, processor 24, executing front-end compiler 26, may include function calls in generating intermediate code 22. These function calls may identify the hierarchical structure of source code 20. Back-end compiler 34 may then utilize these function calls to determine the manner in which to compile intermediate code 22 to generate object code 30.

For instance, keeping with the previous example, the sub-routine that includes the instructions the for-loop in source code 20 may be considered as being at a higher level than the sub-routine that is part of the for-loop. This is because the higher level sub-routine (e.g., the one that includes the instructions of the for-loop) cannot complete until all instances of the lower level sub-routine (e.g., the instructions that are looped), and the lower level sub-routine is implemented in source code 20 to execute more times than the higher level sub-routine.

The above example was based on a for-loop to illustrate higher level sub-routine and lower level sub-routine of the hierarchical structure of source code 20. However, the techniques are not limited to loops and extend to other sub-routines as well. For instance, a higher level sub-routine may include instructions that indicate that a lower level sub-routine is to be executed N number of times, but not necessarily define this as a for-loop. Other such examples exist and the techniques should not be considered limited to the above examples.

Also, in source code 20 a lower level sub-routine may be defined as executing more times than a higher level sub-routine. However, at execution, this may not hold true. For example, assume that instructions of the higher level sub-routine indicate that a lower level sub-routine is to execute N number of times, and there exist N number SIMD lanes on GPU 36. In this example, back-end compiler 34 may copy the intermediate code 22 that includes the code for the lower level sub-routine and copy that lower level sub-routine code along with the higher level sub-routine code N number of times. In this example, the higher level sub-routine and the lower level sub-routine would both execute N number of times. However, in source code 20 the lower level sub-routine was defined to execute more frequently than the higher level sub-routine.

There may be various ways in which front-end compiler 26 may delineate between different hierarchical sub-routines. As described above, in accordance with OpenCL™, the developer may develop source code 20 with workgroups, subgroups, and work-items (e.g., different examples of sub-routines). During developing, each of the workgroups, subgroups, and work-items may be assigned respective identification values (e.g., workgroup1, workgroup2, subgroup1, subgroup2, work-item1, work-item2, and so forth). Front-end compiler 26 may utilize the sub-routine identification values to determine hierarchical boundaries (e.g., where a lower level sub-routine is embedded in a higher-level sub-routine). There may be other ways in which front-end compiler 26 may determine to which level a particular sub-routine belongs, and the techniques should not be considered limited to the above examples.

In some examples, front-end compiler 26 may separate out the different sub-routines, and each level of the sub-routines may be identified by a function call. For instance, the highest level sub-routine (e.g., workgroup) may be referred to as an operation entry point function (OpEntryPointSKernel) or an operation function workgroup function (OpFunctionWG or OpWGFunctionCall). The intermediate level sub-routine (e.g., subgroup) may be referred to as an operation function subgroup function (OpFunctionSG or OpSGFunctionCall). The lowest level sub-routine (e.g., work-item) may be referred to as an operation function work-item function (OpFunctionWI or OpWIFunctionCall). The lowest level sub-routine may be simply referred to as OpFunction as well.

In parsing through source code 20, processor 24, via the execution of front-end compiler 26, may replace, in a higher level sub-routine, code of a lower level sub-routine with a function call to that lower level sub-routine. As an example, a subgroup name may be identified as SG1 and front-end compiler 26 may replace the code for subgroup SG1 with a function call: OpSGFunctionCall(SG1). As another example, a work-item, with identification value WI1, may be embedded in a workgroup. In this example, during parsing of the source code for the workgroup, front-end compiler 26 may replace the code for work-item WI1 in the workgroup with a function call: OpWGFunctionCall(WI1). In the above examples, OpSGFunctionCall(SG1) can be considered as a function call in the workgroup sub-routine that calls for execution of SG1 (e.g., a lower level sub-routine). Similarly, OpWGFunctionCall(WI1) can be considered as a function call in the workgroup sub-routine or the subgroup sub-routine that calls for execution of WI1 (e.g., a lower level sub-routine).

As described above, user device 14 may retrieve intermediate code 22 from host device 12 via channel 16. In some cases, intermediate code 22 may include intermediate code for separated out sub-routines rather than a continuous set of intermediate code with the sub-routines directly embedded in intermediate code 22. For example, user device 14 may retrieve the intermediate code for each of the workgroup, subgroup, and work-item sub-routines separately, as part of retrieving intermediate code 22, rather than one single continuous set of instructions for intermediate code 22. While the sub-routines may be delineated into separate units, each of the higher level sub-routines may include one or more function calls to one or more lower level sub-routines.

After retrieval and storage of intermediate code 22 in memory unit 28, processor 32 executes back-end compiler 34 to compile intermediate code 22 to generate object code 30. Back-end compiler 34 may be configured to parse through intermediate code 22 and at every instance of a function call to a lower level sub-routine determine whether to flatten out the function calls to the lower level sub-routine or execute the lower level sub-routines in a predominately sequential fashion. As described above, flattening out the function calls means executing more of the function call in parallel.

As an example, processor 32 may determine whether the application for which back-end compiler 34 is generating object code 30 is to execute on processor 32 or GPU 36. In addition, processor 32 may be pre-configured with information (or may receive such information during run-time) indicating the processing capabilities of processor 32 and GPU 36. For instance, processor 32 may be pre-configured (e.g., the operating system of processor 32) with information indicating the number of SIMD lanes on GPU 36 (e.g., how many instructions GPU 36 can execute in parallel). Similarly, processor 32 may be pre-configured with information indicating how many instructions processor 32 can execute in parallel.

In this way, back-end compiler 34 may compile intermediate code 22 in such a way so as to exploit the processing capabilities of the processing unit on which the application is to execute. For example, if processor 32 determines that the application is to execute on processor 32, then back-end compiler 34 may parse intermediate code 22 and for instances where intermediate code 22 indicates execution of multiple instances of the same lower level sub-routine in a higher level sub-routine (e.g., multiple calls to same lower level sub-routine), back-end compiler 34 may arrange these as sequential instructions for execution in object code 30 because processor 32 does not provide parallel processing capabilities. If processor 32 determines that the application is to execute on GPU 36, then back-end compiler 34 may parse intermediate code 22 and for instances where intermediate code 22 indicates execution of multiple instances of the same lower level sub-routine in a higher level sub-routine, back-end compiler 34 may arrange these as parallel instructions for execution in object code 30 because GPU 36 provides parallel processing capabilities.

In some examples, there may not be sufficient SIMD lanes in GPU 36 for full parallel execution. For these cases, back-end compiler 34 may parallelize execution as much as possible, but use loops if needed. As an example, if 32 parallel instructions need to be processed, but there are only 16 SIMD lanes, back-end compiler 34 may execute 16 instances of the lower level sub-routines in parallel, but include a loop of two executions so that all 32 instances of the lower level sub-routine executes.

As described above, a work-item is the lowest level sub-routine. In some examples, back-end compiler 34 upon parsing a function call to a work-item may determine that the work-item is to be implemented on a per thread basis (e.g., multiple instances of single instructions of the work-items being executed in parallel). Therefore, front-end compiler 26 may be considered as compiling work-item sub-routines at the thread level.

Back-end compiler 34 upon parsing a function call to a subgroup may determine the subgroup is implemented on a per wave basis (e.g., a plurality of threads together form a wave). For example, implementing on a per wave basis means that the instructions, as well as the data, for the threads that make up the wave is the same. In this example, because the higher level sub-routine is constant for many execution cycles of the lower level sub-routine, the subgroup sub-routine may be considered as a wave for the work-items sub-routines that the subgroup sub-routine calls.

In some examples, front-end compiler 26 may copy multiple instances of the lower level sub-routine (e.g., based on the number of times the lower level sub-routine is to execute so that the number of copies equals the number of times the lower level sub-routine is to execute). Front-end compiler 26 may compile these multiple instances of the lower level sub-routine together into a SIMD instruction, and provide a single function call to a sub-routine that includes multiple copies of the lower level sub-routine. In such examples, if the application is to execute on GPU 36, back-end compiler 34 may separate out the multiple copies of the lower level sub-routines for parallel execution.

The above examples were described with respect to for-loops as the example. However, the techniques described in this disclosure may be applicable to other cases, such as vector operations as well. For example, an N-bit variable may be considered as multiple M-bit floats (e.g., a 128 bit variable is 4 32 bit floats). An instruction may define a process that is to be performed for the N-bit variable, and this process may then be applied to the M-bit floats.

For example, using float4 to represent a 128-bit SSE (streaming SIMD extensions), the following is an example set of instructions:
float a=1.f;
float4 b=(float4)a; //This has carried the 1.f 4 times across the float4
b.x=2.f; //update only the first of 4 values
float c=sum(b); //add each element of b. c should have the value 5 (2+1+1+1)

However, the above set of instructions can be split up based on the number of SIMD lanes available, so that the instructions can be performed in parallel. For instance, in the hierarchical code, the instructions may apply operations to b by including b in a more fine-grained function. As an example,

```
float a = 1.f;
float b = a;
if(get_local_id(0) == 0){
  b = 2.f;
}
c = cross-lane-sum(b).
```

In the above code, each of the four floats is operated on in different lanes. For example, in the first lane (e.g., for which get_local_id(0)=0), the value of b is set equal to 2, and for all other lanes, the value of b is equal to 1 (e.g., due to float b=a). Then c equals the sum across the lanes for 2+1+1+1 equal to 5.

In this way, the first set of instructions for the 128-bit SSE may be considered as coarse-grained functions and the second set of instructions for the 128-bit SSE may be considered as fine-grained functions. In some cases, it may be possible to combine the two formats. For instance, there is hierarchical code where a coarse-grained function calls the fine-grained functions. As an example,

```
float a = if;
float4 b = (float4)a;
b = fine-update(b); //This would be one of the coarse-to-fine function call
                    instructions in the intermediate language (IL)
float c = sum(b);
``` where b is a fine-grained function in the IL, which can be represented as:

```
void fine-update(float b) {
  if(get_local_id(0) == 0) {
    b = 2.f;
  }
  return b;
}
```

In this example, there is a float4 variable (128-bit vector) in the coarse-grained code that maps directly to a 32-bit float in the fine-grained code. In the above example, cross-lane functions can be applied to a coarse-grained code so that the same data can be updated either as vector code (128-bit 4-elements at a time in the above example) or in fine-grained code.

Accordingly, in some examples, user device 14 may be considered as a device for compiling. In such examples, processor 32 may be configured to receive intermediate code 22 that was generated from compiling source code 20 of an application. As described, intermediate code 22 includes information generated from the compiling by front-end compiler 26, where intermediate code 22 identifies a hierarchical structure of lower level sub-routines in higher level sub-routines. The lower level sub-routines are defined in source code 20 of the application to execute more frequently than the higher level sub-routines that identify the lower level sub-routines. Processor 32, via back-end compiler 34, compiles intermediate code 22 to generate object code 30 based on the information that identifies lower level sub-routines in the higher level sub-routines. Processor 32 stores object code 30 in memory unit 28.

In one example, processor 32 may determine that processor 32 is to execute object code 30 and may execute object code 30. In this example, to compile, processor 32, via back-end compiler 34, may compile intermediate code 22 to generate object code 30 that causes processor 32 to sequentially execute multiple instances of the lower level sub-routines.

In another example, processor 32 may determine that GPU 36 is to execute object code 30, and may instruct GPU 36 to execute object code 30. In this example, to compile, processor 32, via back-end compiler 34, may compile intermediate code 22 to generate object code 30 that causes GPU 36 to execute multiple instances of the lower level sub-routines in parallel.

For back-end compiler 34 to compile intermediate code 22, back-end compiler 34 may identify function calls in the higher level sub-routines that call for execution of lower level sub-routines (e.g., OpFunctionSG or OpSGFunctionCall, OpFunctionWI or OpWIFunctionCall call for execution of lower level sub-routines based on their respective identifications such as SG1 or WI1). Back-end compiler 34 may determine from the higher level sub-routines a number of times the lower level sub-routines are to execute (e.g., if there is a for-loop or an instruction in the higher level sub-routine that defines the number of times the lower level sub-routines are to execute).

Back-end compiler 34 may generate the object code based on the determination of the number of times the lower level sub-routines are to execute. For example, if executing on processor 32, then back-end compiler 34 may generate object code 30 that causes processor 32 to sequentially execute the lower level sub-routines the number of times the lower level sub-routines are to execute. If executing on GPU 36, then back-end compiler 34 may generate object code 30 that causes GPU 36 to execute multiple instances, as defined by the number of times the lower level sub-routine is to execute, in parallel.

In some examples, but not necessarily all, back-end compiler 34 may generate object code 30 on-the-fly. For instance, processor 32 may execute a program that utilizes the application for which object code 30 was generated (e.g., a video game utilizes a vertex shader for which object code was generated in accordance with the techniques described in this disclosure). In this example, processor 32, via back-end compiler 34, may compile intermediate code 22 during the execution of the program (e.g., compile the object code for the vertex shader during the execution of the video game).

Figure 2:
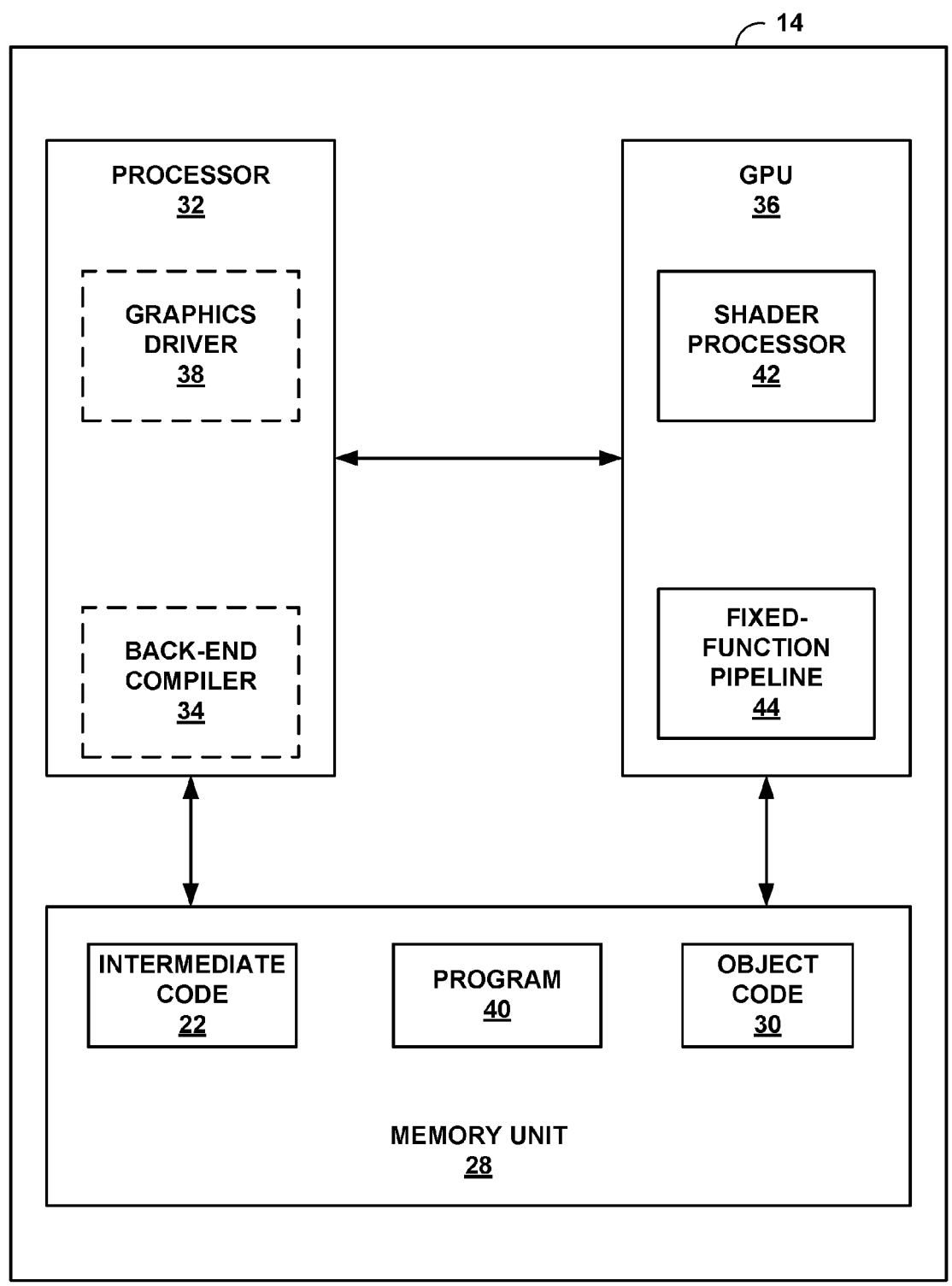
FIG. 2 is a block diagram illustrating a device that may be configured to implement aspects of this disclosure.

FIG. 2 is a block diagram illustrating an example of device 14 that may implement one or more example techniques described in this disclosure. As illustrated in FIG. 2, and like the example in FIG. 1, device 14 may include processor 32 (e.g., a central processing unit (CPU)), GPU 36, and memory unit 28. Device 14 may include components in addition to those illustrated in FIG. 1.

Moreover, in some examples, processor 32 and GPU 36 may be formed as a common integrated circuit that is housed within a single circuit package (e.g., formed as a common processor). However, aspects of this disclosure are not so limited, and one or more of processor 32 and GPU 36 may be separate integrated circuits that are housed in separate circuit packages. In general, device 14 may be considered as including an integrated circuit that includes processor 32 that is configured to perform one or more of the example techniques described in this disclosure.

Memory unit 28 may be an example of a computer-readable storage medium. For example, in addition to storing object code 30 and intermediate code 22, memory unit 28 may store instructions that cause processor 32 and GPU 36 to perform functions ascribed to each in this disclosure. Memory unit 28 may be considered as a computer-readable storage medium comprising instructions that cause one or more processors (e.g., processor 32 or GPU 36) to perform various functions.

Memory unit 28 may, in some examples, be considered as a non-transitory storage medium. The term "non-transitory" may indicate that the storage medium is not embodied in a carrier wave or a propagated signal. However, the term "non-transitory" should not be interpreted to mean that memory unit 28 is non-movable. As one example, memory unit 28 may be removed from device 14, and moved to another device. As another example, a storage device, substantially similar to memory unit 28, may be inserted into device 14. In certain examples, a non-transitory storage medium may store data that can, over time, change (e.g., in RAM).

GPU 36 may include shader processor 42 and fixed-function pipeline 44. Shader processor 42, sometimes referred to as a shader core, may be a core of GPU 36 upon which object code of programs execute. For example, object code 30 may execute on shader processor 42, and in some examples, may execute in a parallel manner (e.g., at the same time) via the multiple processing elements of shader processor 42. As an example, it is the number of processing elements in shader processor 42 that processor 32 may utilize to determine how back-end compiler 34 is to compile intermediate code 22 (e.g., the number of processing elements of shader processor 42 defines the number of SIMD lanes of GPU 36).

Fixed-function pipeline 44 may include hardware units that perform fixed functions. Fixed-function pipeline 44 and shader processor 42 together form a pipeline for processing with GPU 36. For example, after processing shader processor 42 may generate data that one or more units of fixed-function pipeline 44 receive for further processing, and each unit outputs to the next with shader processor 42 intermittently performing some processing (e.g., via vertex shader, geometry shader, or pixel shader), until GPU 36 outputs the final generated data to memory unit 28.

Processor 32 may execute one or more programs, such as program 40, stored in memory unit 28. Examples of program 40 include, but are not limited to, web browsers, user interfaces, e-mail applications, spreadsheet applications, word processing applications, graphics authoring applications, video games, or other applications that generate viewable objects for display. For instance, program 40 may be a video game that when executed outputs graphical content that is displayed on a display. As one example, program 40 may cause GPU 36 or processor 32 to execute object code 30 (e.g., program 40 is a video game and object code 30 is for a vertex shader and the video game causes GPU 36 to execute the vertex shader). In some such examples, processor 32 may compile on-the-fly (e.g., during execution of program 40) intermediate code 22 to generate object code 30 which is utilized by program 40.

As described above, processor 32 may receive intermediate code 22 and execute back-end compiler 34. Via back-end compiler 34, processor 32 may compile intermediate code 22 in the intermediate language (e.g., SPIR) to generate object code 30 based on the information that identifies lower level sub-routines in higher level sub-routines and store object code 30 for eventual execution. Processor 32 may store object code 30 in memory unit 28. Although memory unit 28 is illustrated as external to processor 32 and GPU 36, in some examples, memory unit 28 may be partially within processor 32 and GPU 36. For example, processor 32 and GPU 36 each include (separately or together) internal memory such as cache memory. This internal memory may be considered as being part of the general term of a memory unit (e.g., part of memory unit 28).

In some examples, back-end compiler 34 may compile intermediate code 22 based on the processor type on which the application is to execute. For example, if object code 30 is to execute on processor 32, then back-end compiler 34 may utilize the information in intermediate code 22 to optimize object code 30 for execution on processor 32 (e.g., for sequential execution). If object code 30 is to execute on GPU 36, then back-end compiler 34 may utilize the information in intermediate code 22 to optimize object code 30 for execution on GPU 36 (e.g., for parallel execution).

As described above, intermediate code 22 may be generated by host device 12 that includes processor 24 executing front-end compiler 26. However, the examples are not necessarily so limited. In some examples, processor 32 may execute front-end compiler 26 and back-end compiler 34 or execute a single compiler that performs the functions of both front-end compiler and back-end compiler. Processor 32, in such examples, may generate intermediate code 22.

As also illustrated in FIG. 2, processor 32 may be configured to execute graphics driver 38. The functionality of graphics driver 38 may be performed by hardware or firmware or a combination of hardware, software, and firmware. For ease, graphics driver 38 is described as software executing on processor 32.

Graphics driver 38 may be designed in accordance with a particular standard. Graphics driver 38 executing on processor 32 may be configured to implement an application programming interface (API) (e.g., OpenGL™ or OpenCL™ or a combination of both). In such examples, the shader programs or kernels (e.g., the applications for which object code 30 is generated) may be configured in accordance with the same API as graphics driver 38 (e.g., kernels in accordance with OpenCL™ and shader programs in accordance with OpenGL™). Although not illustrated, memory unit 28 may store the code for graphics driver 38 that processor 32 retrieves from memory unit 28 for execution.

Graphics driver 38 may be configured to perform the communication between processor 32 and GPU 36. Accordingly, in this disclosure, when processor 32 is described as instructing or otherwise communicating with GPU 36, processor 32 is performing such functions via graphics driver 38. For example, when GPU 36 is to execute object code 30, processor 32 may instruct, via graphics driver 38, GPU 36 to execute object code 30 (e.g., retrieve object code 30 from memory unit 28 and execute instructions of object code 30).

Figure 3:
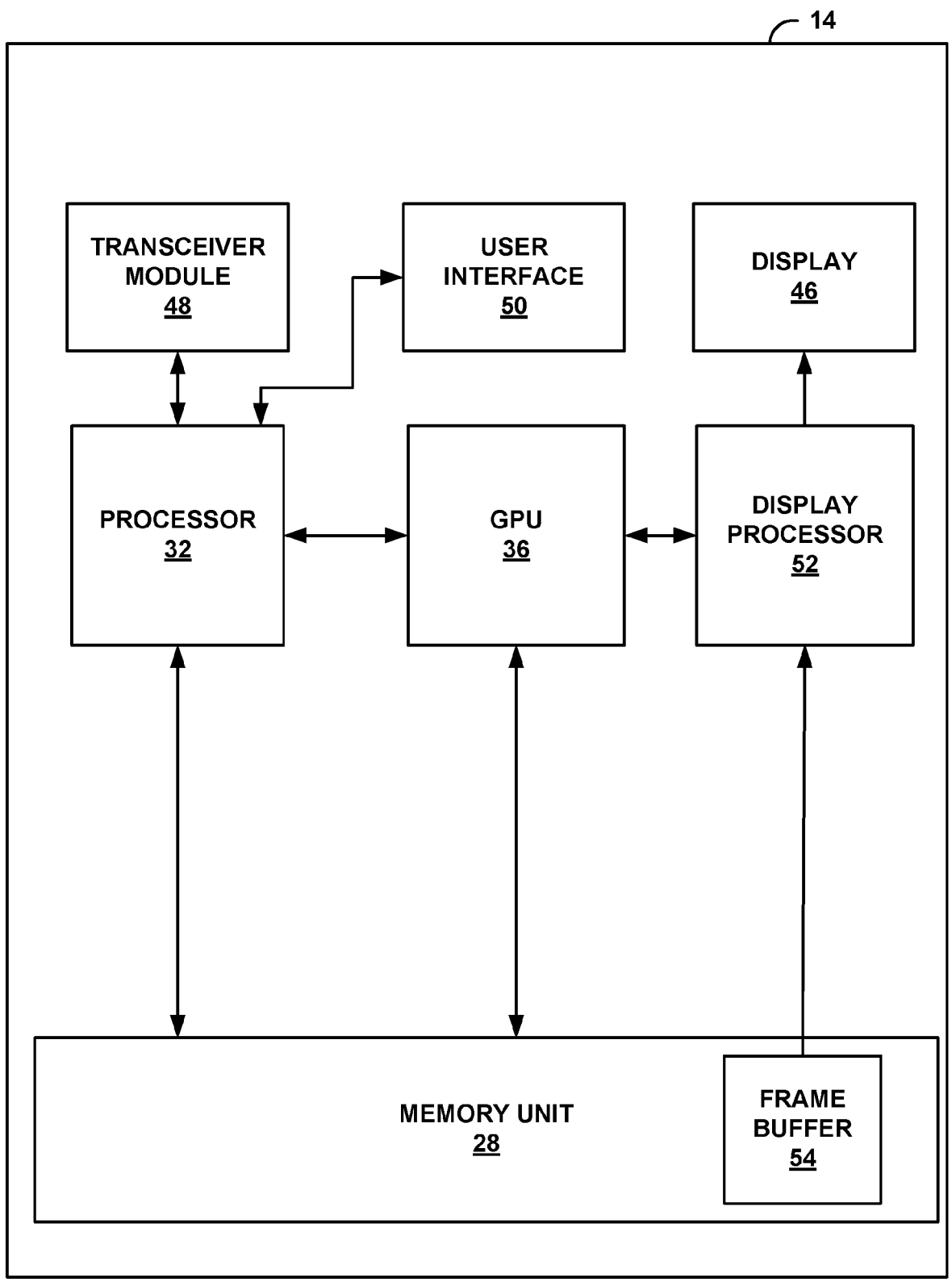
FIG. 3 is a block diagram illustrating the example device of FIG. 2 in further detail.

FIG. 3 is a block diagram illustrating the example device of FIG. 2 in further detail. For example, as indicated above, examples of device 14 include, but are not limited to, mobile wireless telephones, PDAs, video gaming consoles that include video displays, mobile video conferencing units, laptop computers, desktop computers, television set-top boxes, and the like.

As illustrated in FIG. 3, device 14 may include display 46, processor 32, GPU 36, memory unit 28, which includes frame buffer 54, transceiver module 48, user interface 50, and display processor 52. Processor 32, GPU 36, and memory unit 28 may be substantially similar or identical to those illustrated in FIG. 1. For purposes of brevity, only the components that are shown in FIG. 3, but not shown in FIG. 1 or 2 are described in detail.

Device 14, as illustrated in FIG. 3, may include additional modules or units not shown in FIG. 3 for purposes of clarity. For example, device 14 may include a speaker and a microphone, neither of which are shown in FIG. 3, to effectuate telephonic communications in examples where device 14 is a mobile wireless telephone or a speaker where device 14 is a media player. Furthermore, the various modules and units shown in device 14 may not be necessary in every example of device 14. For example, user interface 50 and display 46 may be external to device 14 in examples where device 14 is a desktop computer or other device that is equipped to interface with an external user interface or display. As another example, user interface 50 may be part of display 46 in examples where display 46 is a touch-sensitive or presence-sensitive display of a mobile device.

Display 46 may comprise a liquid crystal display (LCD), a cathode ray tube (CRT) display, a plasma display, a touch-sensitive display, a presence-sensitive display, or another type of display device. Examples of user interface 50 include, but are not limited to, a trackball, a mouse, a keyboard, and other types of input devices. User interface 50 may also be a touch screen and may be incorporated as a part of display 46.

Transceiver module 48 may include circuitry to allow wireless or wired communication between device 14 and another device or a network (e.g., via channel 16 of FIG. 1).

Transceiver module 48 may include one or more modulators, demodulators, amplifiers, antennas and other such circuitry for wired or wireless communication.

Display processor 52 may be configured to output graphics data to display 46. For example, display processor 52 receives data from frame buffer 54, which stores graphic data outputted by GPU 36. Display processor 52 outputs the retrieved data and controls display 46 to display the graphics data.

Figure 4:
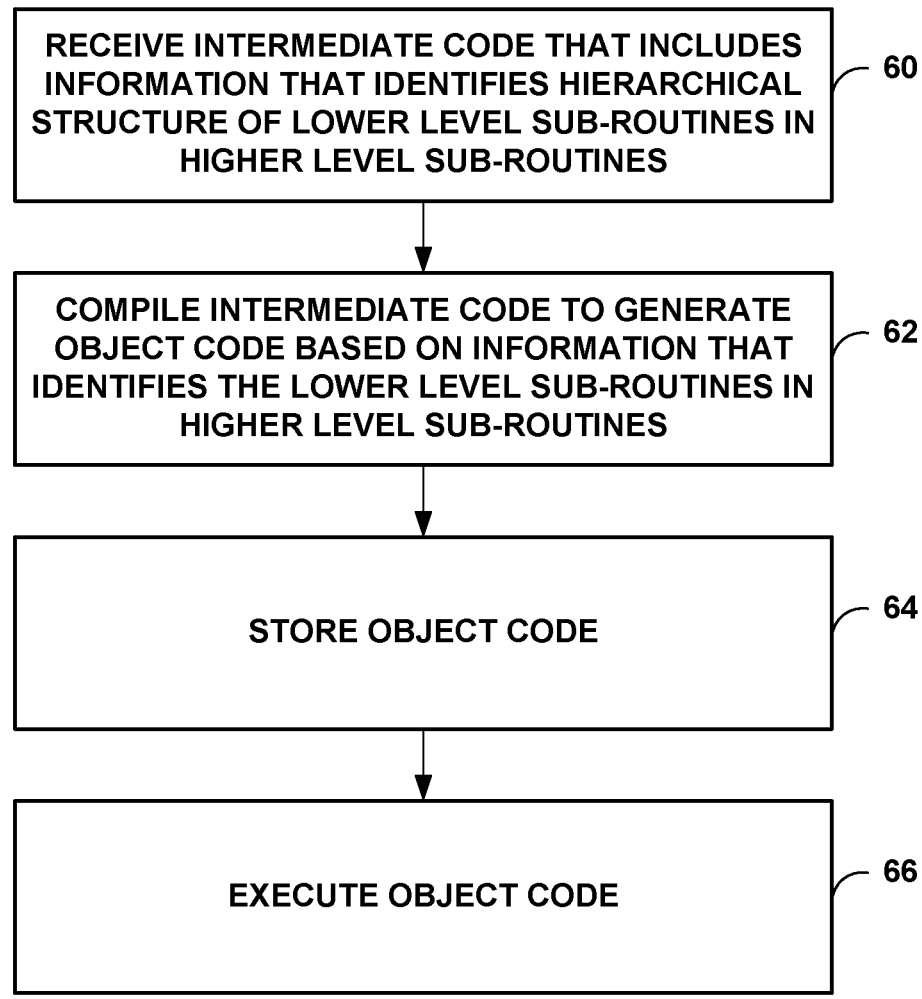
FIG. 4 is a flowchart illustrating an example for implementing aspects of this disclosure.

FIG. 4 is a flowchart illustrating an example for implementing aspects of this disclosure. The example illustrated in FIG. 4 is described with respect to processor 32. For example, a device for compiling, such as user device 14 may include memory unit 28 and an integrated circuit comprising processor 32 that is configured to perform the example techniques illustrated in FIG. 4.

In the example illustrated in FIG. 4, processor 32 may receive intermediate code 22 that was generated from compiling source code 20 of an application (60). As described above and indicated in FIG. 4, intermediate code 22 includes information generated from the compiling that identifies a hierarchical structure of lower level sub-routines in higher level sub-routines, and the lower level sub-routines are defined in the source code of the application to execute more frequently than the higher level sub-routines that identify the lower level sub-routines.

In some examples, processor 32 may receive intermediate code for the higher level sub-routines separate from intermediate code for the lower level sub-routines. For example, intermediate code 22 may not be sequential code that includes the intermediate code for all sub-routines. Rather, intermediate code 22 may include intermediate code for a higher level sub-routine in form of a first function, and include intermediate code for a lower level sub-routine in form of a second function. The first function may call the second function for execution, but when processor 32 receives the first and second functions, processor 32 may receive the first and second functions separately.

Processor 32, via back-end compiler 34, may compile intermediate code 22 to generate object code 30 based on the information that identifies the lower level sub-routines in the higher level sub-routines (62). As one example, back-end compiler 34 may identify function calls in the higher level sub-routines that call for execution of the lower level sub-routines. Back-end compiler 34 may determine from the higher level sub-routines a number of times the lower level sub-routines are to execute, and generate object code 30 based on the determination of the number of times the lower level sub-routines are to execute.

Processor 32 may store object code 30 (64). For example, processor 32 may write object code 30 to memory unit 28 for eventual execution. For instance, one of processor 32 or GPU 36 may execute object code 30 (66).

As one example, processor 32 may determine that processor 32 is to execute object code 30 and processor 32 may execute object code 30. In this example, to compile, processor 32, via back-end compiler 34, may compile intermediate code 22 to generate object code 30 that causes processor 32 to sequentially execute multiple instances of the lower level sub-routines. As another example, processor 32 may determine that GPU 36 is to execute object code 30 and processor 32 may instruct, via graphics driver 38, GPU 36 to execute object code 30 on one or more processing elements of shader processor 42. In this example, to compile, processor 32, via back-end compiler 34, may compile intermediate code 22 to generate object code 30 that causes GPU 36 to execute multiple instances of the lower level sub-routines in parallel.

Figure 5:
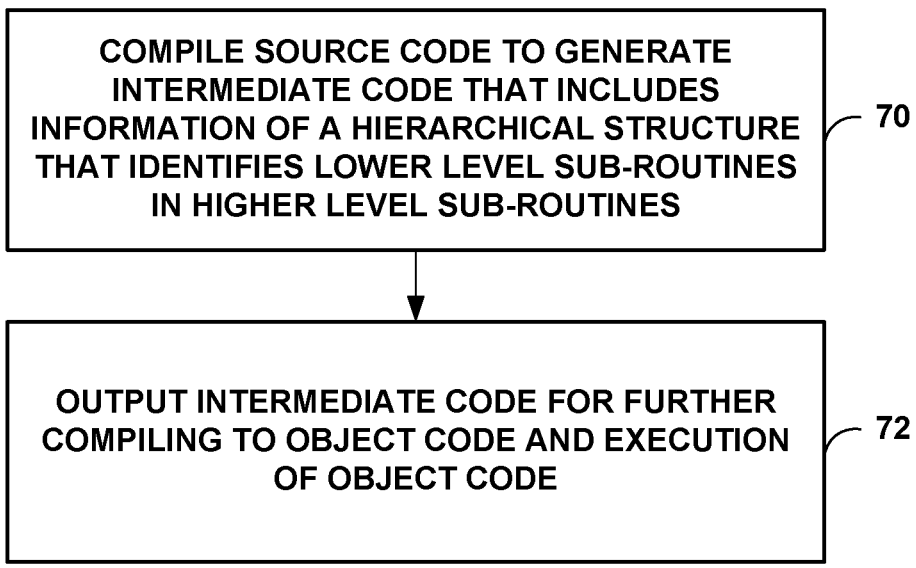
FIG. 5 is a flowchart illustrating another example for implementing aspects of this disclosure.

FIG. 5 is a flowchart illustrating another example for implementing aspects of this disclosure. As illustrated, processor 24, via front-end compiler 26, may compile source code 20 to generate intermediate code 22 that includes information of a hierarchical structure that identifies lower level sub-routines in higher level sub-routines (70). Processor 24 may then output intermediate code 22 via channel 16 for eventual reception and execution by user device 14 (72). For example, user device 14 may perform the example technique described above with respect to FIG. 4 such as compiling intermediate code to generate object code based on the information that identifies lower level sub-routines and higher level sub-routines, storing the object code, and executing the object code.

As described above, in generating intermediate code 22, front-end compiler 26 may differentiate between higher level sub-routines and lower level sub-routines based on identification information in source code 20. When front-end compiler 26 parses a lower level sub-routine in a higher level sub-routine, front-end compiler 26 replaces the lower level sub-routine in the higher level sub-routine with a function call to the lower level sub-routine. These function calls call for execution of the lower level sub-routines, and what back-end compiler 34 relies upon for generating object code 30.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media or communication media including any medium that facilitates transfer of a computer program from one place to another. Data storage device may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of compiling, the method comprising:
   receiving, with a processor, intermediate code that was generated from compiling source code of an application, wherein the intermediate code includes information generated from the compiling that identifies a hierarchical structure of lower level sub-routines in higher level sub-routines, wherein the lower level sub-routines are defined in the source code of the application to execute more frequently than the higher level sub-routines that identify the lower level sub-routines, wherein the information generated that identifies the hierarchical structure includes function calls in the higher level sub-routines that call for execution of the lower level sub-routines, and wherein receiving the intermediate code comprises receiving intermediate code for the higher level sub-routines separate from intermediate code for the lower level sub-routines;
   compiling, with the processor, the intermediate code to generate object code based on the information that identifies the lower level sub-routines in the higher level sub-routines, wherein compiling comprises arranging the function calls in the higher level sub-routines for the lower level sub-routines based on a determination of whether the object code is to be executed on the processor, a graphics processing unit (GPU), or a digital signal processor (DSP), and based on a number of times the lower level sub-routines are to execute; and
   storing the object code.

2. The method of claim 1, further comprising:
   determining that the processor is to execute the object code; and
   executing, with the processor, the object code,
   wherein arranging comprises arranging the function calls in the higher level sub-routines that causes the processor to sequentially execute multiple instances of the lower level sub-routines.

3. The method of claim 1, further comprising:
   determining that the GPU or the DSP is to execute the object code; and
   instructing the GPU or the DSP to execute the object code,
   wherein arranging comprises arranging the function calls in the higher level sub-routines that causes the GPU or the DSP to execute multiple instances of the lower level sub-routines in parallel.

4. The method of claim 1, wherein compiling further comprises:
   identifying function calls in the higher level sub-routines that call for execution of the lower level sub-routines;
   determining from the higher level sub-routines the number of times the lower level sub-routines are to execute; and
   generating the object code based on the arrangement of the function calls in the higher level sub-routines for the lower level sub-routines.

5. The method of claim 1, further comprising:
   executing, with the processor, a program that utilizes the application, wherein compiling comprises compiling the intermediate code during execution of the program.

6. A device for compiling, the device comprising:
a memory unit; and
an integrated circuit comprising a processor, the processor configured to:
receive intermediate code that was generated from compiling source code of an application, wherein the intermediate code includes information generated from the compiling that identifies a hierarchical structure of lower level sub-routines in higher level sub-routines, wherein the lower level sub-routines are defined in the source code of the application to execute more frequently than the higher level sub-routines that identify the lower level sub-routines, wherein the information generated that identifies the hierarchical structure includes function calls in the higher level sub-routines that call for execution of the lower level sub-routines, and wherein to receive the intermediate code, the processor is configured to receive intermediate code for the higher level sub-routines separate from intermediate code for the lower level sub-routines;
compile the intermediate code to generate object code based on the information that identifies the lower level sub-routines in the higher level sub-routines, wherein to compile the processor is configured to arrange the function calls in the higher level sub-routines for the lower level sub-routines based on a determination of whether the object code is to be executed on the processor, a graphics processing unit (GPU), or a digital signal processor (DSP), and based on a number of times the lower level sub-routines are to execute; and
store the object code in the memory unit.

7. The device of claim 6, wherein the processor is configured to:
determine that the processor is to execute the object code; and
execute the object code,
wherein to arrange, the processor is configured to arrange the function calls in the higher level sub-routines that causes the processor to sequentially execute multiple instances of the lower level sub-routines.

8. The device of claim 6, the device further comprising:
the GPU or the DSP,
wherein the processor is configured to:
determine that the GPU or the DSP is to execute the object code; and
instruct the GPU or the DSP to execute the object code,
wherein to arrange, the processor is configured to arrange the function calls in the higher level sub-routines that causes the GPU or the DSP to execute multiple instances of the lower level sub-routines in parallel.

9. The device of claim 6, wherein to compile, the processor is configured to:
identify function calls in the higher level sub-routines that call for execution of the lower level sub-routines;
determine from the higher level sub-routines the number of times the lower level sub-routines are to execute; and
generate the object code based on the arrangement of the function calls in the higher level sub-routines for the lower level sub-routines.

10. The device of claim 6, wherein the processor is configured to:
execute a program that utilizes the application,
wherein to compile, the processor is configured to compile the intermediate code during execution of the program.

11. The device of claim 6, wherein the device comprises a wireless communication device.

12. A device for compiling, the device comprising:
means for receiving intermediate code that was generated from compiling source code of an application, wherein the intermediate code includes information generated from the compiling that identifies a hierarchical structure of lower level sub-routines in higher level sub-routines, wherein the lower level sub-routines are defined in the source code of the application to execute more frequently than the higher level sub-routines that identify the lower level sub-routines, wherein the information generated that identifies the hierarchical structure includes function calls in the higher level sub-routines that call for execution of the lower level sub-routines, and wherein the means for receiving the intermediate code comprises means for receiving intermediate code for the higher level sub-routines separate from intermediate code for the lower level sub-routines;
means for compiling the intermediate code to generate object code based on the information that identifies the lower level sub-routines in the higher level sub-routines, wherein the means for compiling comprises means for arranging the function calls in the higher level sub-routines for the lower level sub-routines based on a determination of whether the object code is to be executed on the processor, a graphics processing unit (GPU), or a digital signal processor (DSP), and based on a number of times the lower level sub-routines are to execute; and
means for storing the object code.

13. The device of claim 12, further comprising:
means for determining that a processor that includes the means for compiling is to execute the object code; and
means for executing the object code,
wherein the means for arranging comprises means for arranging the function calls in the higher level sub-routines that causes the processor to sequentially execute multiple instances of the lower level sub-routines.

14. The device of claim 12, further comprising:
means for determining that the GPU or the DSP is to execute the object code; and
means for instructing the GPU or the DSP to execute the object code,
wherein the means for arranging comprises means for arranging the function calls in the higher level sub-routines that causes the GPU or the DSP to execute multiple instances of the lower level sub-routines in parallel.

15. The device of claim 12, wherein the means for compiling comprises:
means for identifying function calls in the higher level sub-routines that call for execution of the lower level sub-routines;
means for determining from the higher level sub-routines the number of times the lower level sub-routines are to execute; and
means for generating the object code based on the arrangement of the function calls in the higher level sub-routines for the lower level sub-routines.

16. The device of claim 12, further comprising:
means for executing a program that utilizes the application,
wherein the means for compiling comprises means for compiling the intermediate code during execution of the program.

17. A non-transitory computer-readable storage medium comprising instructions that when executed cause one or more processors to:
receive intermediate code that was generated from compiling source code of an application, wherein the intermediate code includes information generated from the compiling that identifies a hierarchical structure of lower level sub-routines in higher level sub-routines, wherein the lower level sub-routines are defined in the source code of the application to execute more frequently than the higher level sub-routines that identify the lower level sub-routines, wherein the information generated that identifies the hierarchical structure includes function calls in the higher level sub-routines that call for execution of the lower level sub-routines, and wherein the instructions that cause the one or more processors to receive the intermediate code comprise instructions that cause the one or more processors to receive intermediate code for the higher level sub-routines separate from intermediate code for the lower level sub-routines;
compile the intermediate code to generate object code based on the information that identifies the lower level sub-routines in the higher level sub-routines, wherein the instructions that cause the one or more processors to compile comprise instructions that cause the one or more processors to arrange the function calls in the higher level sub-routines for the lower level sub-routines based on a determination of whether the object code is to be executed on the one or more processors, a graphics processing unit (GPU), or a digital signal processor (DSP), and based on a number of times the lower level sub-routines are to execute; and
store the object code.

18. The computer-readable storage medium of claim 17, wherein the instructions that cause the one or more processors to compile comprise instructions that cause the one or more processors to:
identify function calls in the higher level sub-routines that call for execution of the lower level sub-routines;
determine from the higher level sub-routines the number of times the lower level sub-routines are to execute; and
generate the object code based on arrangement of the function calls in the higher level sub-routines for the lower level sub-routines.

\* \* \* \* \*